(12) United States Patent
Moura et al.

(10) Patent No.: US 11,098,653 B2
(45) Date of Patent: Aug. 24, 2021

(54) APPARATUS AND METHOD FOR MITIGATING PARTICULATE ACCUMULATION ON A COMPONENT OF A GAS TURBINE

(71) Applicant: United Technologies Corporation, Farmington, CT (US)

(72) Inventors: Dennis M. Moura, South Windsor, CT (US); Carey Clum, East Hartford, CT (US)

(73) Assignee: RAYTHEON TECHNOLOGIES CORPORATION, Farmington, CT (US)

(*) Notice: Subject to any disclaimer, the term of this patent is extended or adjusted under 35 U.S.C. 154(b) by 145 days.

(21) Appl. No.: 16/241,176

(22) Filed: Jan. 7, 2019

(65) Prior Publication Data

US 2019/0218976 A1   Jul. 18, 2019

Related U.S. Application Data

(60) Provisional application No. 62/616,894, filed on Jan. 12, 2018.

(51) Int. Cl.
*F23R 3/06* (2006.01)
*F02C 7/30* (2006.01)
(Continued)

(52) U.S. Cl.
CPC ............... *F02C 7/30* (2013.01); *F01D 25/12* (2013.01); *F01D 25/32* (2013.01); *F02C 7/18* (2013.01);
(Continued)

(58) Field of Classification Search
CPC .. F23R 3/002; F23R 3/04; F23R 3/045; F23R 3/08; F23R 2900/00004;
(Continued)

(56) References Cited

U.S. PATENT DOCUMENTS 8,646,276 B2   2/2014   Davis, Jr. et al.
9,188,336 B2 *  11/2015   Chen .................. F23R 3/002
(Continued)

FOREIGN PATENT DOCUMENTS

EP        0239020 A2    9/1987

OTHER PUBLICATIONS

The Extended European Search Report for Application No. 19151717.6-1006; dated May 21, 2019; 9 pages.

*Primary Examiner* — Arun Goyal
(74) *Attorney, Agent, or Firm* — Cantor Colburn LLP

(57) ABSTRACT

A gas turbine engine component assembly is provided. The gas turbine engine component assembly comprising: a first component having a first surface and a second surface opposite the first surface wherein the first component includes a cooling hole extending from the second surface to the first surface through the first component; a second component having a first surface and a second surface, the first surface of the first component and the second surface of the second component defining a cooling channel therebetween in fluid communication with the cooling hole for cooling the second surface of the second component; and a deflector forming a passageway with the second surface of the first component, the passageway configured to direct airflow into the cooling channel in a lateral direction parallel to the second surface of the second component such that a cross flow is generated in the cooling channel.

10 Claims, 6 Drawing Sheets

(51) Int. Cl.
    *F01D 25/12*     (2006.01)
    *F23R 3/00*     (2006.01)
    *F23R 3/50*     (2006.01)
    *F01D 25/32*     (2006.01)
    *F02C 7/18*     (2006.01)

(52) U.S. Cl.
    CPC .............. *F23R 3/002* (2013.01); *F23R 3/005* (2013.01); *F23R 3/06* (2013.01); *F23R 3/50* (2013.01); *F05D 2220/32* (2013.01); *F05D 2260/201* (2013.01); *F05D 2260/202* (2013.01); *F05D 2260/221* (2013.01); *F05D 2260/607* (2013.01); *F23R 2900/00004* (2013.01); *F23R 2900/03041* (2013.01); *F23R 2900/03044* (2013.01)

(58) Field of Classification Search
    CPC .. F23R 2900/00017; F23R 2900/03041; F23R 2900/03042; F23R 2900/03043; F23R 2900/03044; F23R 2900/03045; F05D 2240/35; F05D 2260/201–202; F05D 2260/607
    See application file for complete search history.

(56) References Cited

U.S. PATENT DOCUMENTS

| | | | |
|---|---|---|---|
| 9,518,737 B2 * | 12/2016 | Pidcock | ................. F23R 3/002 |
| 9,644,843 B2 * | 5/2017 | Herborth | ................. F23R 3/54 |
| 2012/0047908 A1 | 3/2012 | Poyyapakkam | |

* cited by examiner

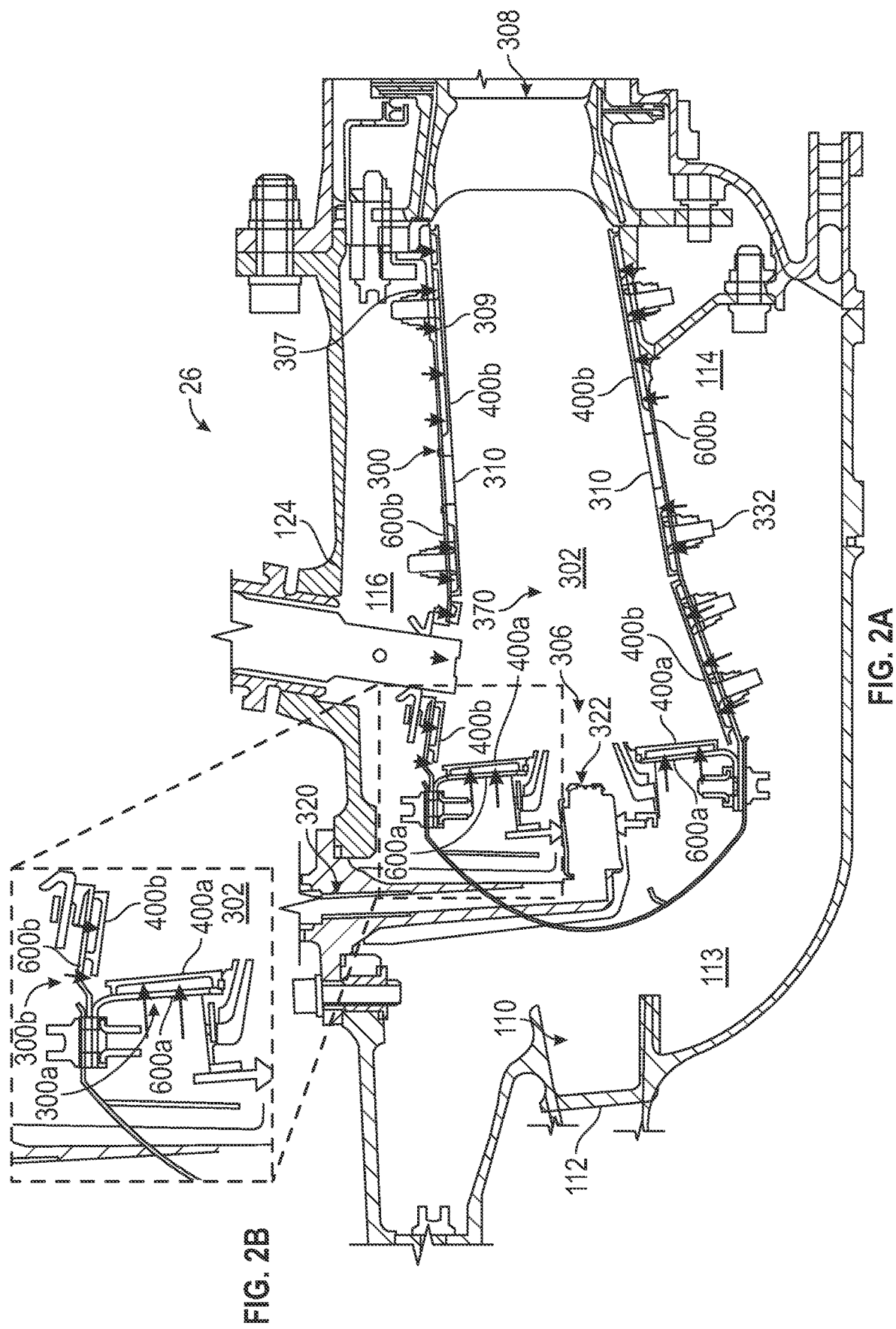

APPARATUS AND METHOD FOR MITIGATING PARTICULATE ACCUMULATION ON A COMPONENT OF A GAS TURBINE

CROSS-REFERENCE TO RELATED APPLICATIONS

This application claims the benefit of U.S. Provisional Application No. 62/616,894 filed Jan. 12, 2018, which is incorporated herein by reference in its entirety.

BACKGROUND

The subject matter disclosed herein generally relates to gas turbine engines and, more particularly, to a method and apparatus for mitigating particulate accumulation on cooling surfaces of components of gas turbine engines.

In one example, a combustor of a gas turbine engine may be configured and required to burn fuel in a minimum volume. Such configurations may place substantial heat load on the structure of the combustor (e.g., panels, shell, etc.). Such heat loads may dictate that special consideration is given to structures, which may be configured as heat shields or panels, and to the cooling of such structures to protect these structures. Excess temperatures at these structures may lead to oxidation, cracking, and high thermal stresses of the heat shields or panels. Particulates in the air used to cool these structures may inhibit cooling of the heat shield and reduce durability. Particulates, in particular atmospheric particulates, include solid or liquid matter suspended in the atmosphere such as dust, ice, ash, sand, and dirt.

SUMMARY

According to one embodiment, a gas turbine engine component assembly is provided. The gas turbine engine component assembly comprising: a first component having a first surface and a second surface opposite the first surface wherein the first component includes a cooling hole extending from the second surface to the first surface through the first component; a second component having a first surface and a second surface, the first surface of the first component and the second surface of the second component defining a cooling channel therebetween in fluid communication with the cooling hole for cooling the second surface of the second component; and a deflector forming a passageway with the second surface of the first component, the passageway configured to direct airflow into the cooling channel in a lateral direction parallel to the second surface of the second component such that a cross flow is generated in the cooling channel.

In addition to one or more of the features described above, or as an alternative, further embodiments may include that the passageway further comprises: a guide wall oriented at a selected angle configured to direct airflow in the lateral direction parallel to the second surface of the second component such that the cross flow is generated in the cooling channel.

In addition to one or more of the features described above, or as an alternative, further embodiments may include an inlet fluidly connecting the passageway to the flow path.

In addition to one or more of the features described above, or as an alternative, further embodiments may include that the inlet passes through the first component.

In addition to one or more of the features described above, or as an alternative, further embodiments may include that the inlet passes through a first component of a second portion of the gas turbine engine assembly.

In addition to one or more of the features described above, or as an alternative, further embodiments may include that the first component and the second component are located in a first portion of gas turbine engine component assembly.

In addition to one or more of the features described above, or as an alternative, further embodiments may include a particulate collection location located opposite the inlet and proximate a particulate separation turn configured to turn the airflow such that a particulate separates from the airflow and is directed into the particulate collection location.

In addition to one or more of the features described above, or as an alternative, further embodiments may include that the second component further comprises a secondary aperture extending from the second surface of the second component to the first surface of the second component and fluidly connecting the cooling channel to the combustion area.

In addition to one or more of the features described above, or as an alternative, further embodiments may include that the inlet passes through the deflector.

In addition to one or more of the features described above, or as an alternative, further embodiments may include an overhang portion partially dividing the passageway.

According to another embodiment, a combustor for use in a gas turbine engine is provided. The combustor enclosing a combustion chamber having a combustion area. The combustor comprises: a combustion liner having an inner surface and an outer surface opposite the inner surface wherein the combustion liner includes a primary aperture extending from the outer surface to the inner surface through the combustion liner; a heat shield panel interposed between the inner surface of the combustion liner and the combustion area, the heat shield panel having a first surface and a second surface opposite the first surface, wherein the second surface is oriented towards the inner surface, and wherein the heat shield panel is separated from the liner by an impingement cavity; and a deflector forming a passageway with the outer surface of the combustion liner, the passageway configured to direct airflow into the impingement cavity in a lateral direction parallel to the second surface of the heat shield panel such that a cross flow is generated in the impingement cavity.

In addition to one or more of the features described above, or as an alternative, further embodiments may include that the passageway further comprises: a guide wall oriented at a selected angle configured to direct airflow in the lateral direction parallel to the second surface of the heat shield panel such that the cross flow is generated in the impingement cavity.

In addition to one or more of the features described above, or as an alternative, further embodiments may include an inlet fluidly connecting the passageway to the flow path.

In addition to one or more of the features described above, or as an alternative, further embodiments may include that the inlet passes through the combustion liner.

In addition to one or more of the features described above, or as an alternative, further embodiments may include that the inlet passes through a combustion liner of an axial shell portion of the combustor.

In addition to one or more of the features described above, or as an alternative, further embodiments may include that the combustion liner and the heat shield panel are located in the bulkhead shell portion of the combustor.

In addition to one or more of the features described above, or as an alternative, further embodiments may include a particulate collection location located opposite the inlet and proximate a particulate separation turn configured to turn the airflow such that a particulate separates from the airflow and is directed into the particulate collection location.

In addition to one or more of the features described above, or as an alternative, further embodiments may include that the heat shield panel further comprises a secondary aperture extending from the second surface of the heat shield panel to the first surface of the heat shield panel and fluidly connecting the impingement cavity to the combustion area.

In addition to one or more of the features described above, or as an alternative, further embodiments may include that the inlet passes through the deflector.

In addition to one or more of the features described above, or as an alternative, further embodiments may include an overhang portion partially dividing the passageway.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION

The following descriptions should not be considered limiting in any way. With reference to the accompanying drawings, like elements are numbered alike:

FIG. 2A is a cross-sectional illustration of a combustor, in accordance with an embodiment of the disclosure;

FIG. 2B is an enlarged cross-sectional illustration of a combustor, in accordance with an embodiment of the disclosure

FIG. 5C-1 is an illustration of a configuration of lateral flow injection features including a deflector for a combustor of a gas turbine engine, in accordance with an embodiment of the disclosure;

FIG. 5C-2 is an illustration of a configuration of lateral flow injection features including a deflector for a combustor of a gas turbine engine, in accordance with an embodiment of the disclosure; and FIG. 5C-3 is an illustration of a configuration of lateral flow injection features including a deflector for a combustor of a gas turbine engine, in accordance with an embodiment of the disclosure.

The detailed description explains embodiments of the present disclosure, together with advantages and features, by way of example with reference to the drawings.

DETAILED DESCRIPTION

A detailed description of one or more embodiments of the disclosed apparatus and method are presented herein by way of exemplification and not limitation with reference to the Figures.

Combustors of gas turbine engines, as well as other components, experience elevated heat levels during operation. Impingement and convective cooling of panels of the combustor wall may be used to help cool the combustor. Convective cooling may be achieved by air that is channeled between the panels and a liner of the combustor. Impingement cooling may be a process of directing relatively cool air from a location exterior to the combustor toward a back or underside of the panels.

Thus, combustion liners and heat shield panels are utilized to face the hot products of combustion within a combustion chamber and protect the overall combustor shell. The combustion liners may be supplied with cooling air including dilution passages which deliver a high volume of cooling air into a hot flow path. The cooling air may be air from the compressor of the gas turbine engine. The cooling air may impinge upon a back side of a heat shield panel that faces a combustion liner inside the combustor. The cooling air may contain particulates, which may build up on the heat shield panels overtime, thus reducing the cooling ability of the cooling air. Embodiments disclosed herein seek to address particulate adherence to the heat shield panels in order to maintain the cooling ability of the cooling air.

Figure 1:
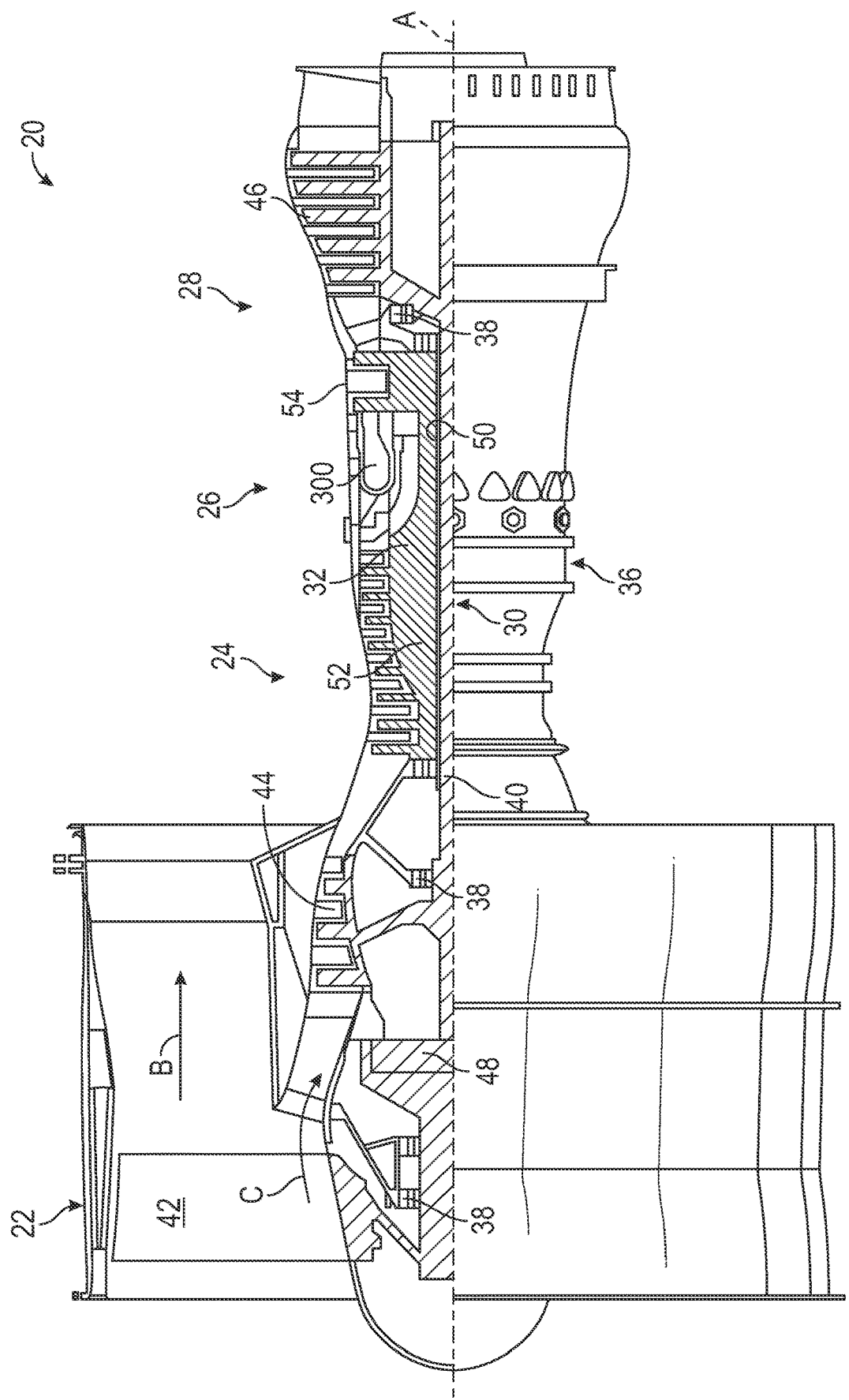
FIG. 1 is a partial cross-sectional illustration of a gas turbine engine, in accordance with an embodiment of the disclosure.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 300 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 300, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,688 meters). The flight condition of 0.8 Mach and 35,000 ft (10,688 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(\text{Tram } ° \text{R})/(518.7° \text{R})]^{0.5}$. The "Low corrected fan tip speed" as disclosed herein according to one non-limiting embodiment is less than about 1150 ft/second (350.5 m/sec).

Referring now to FIGS. 2A and 2B and with continued reference to FIG. 1, the combustor section 26 of the gas turbine engine 20 is shown. As illustrated, a combustor 300 defines a combustion chamber 302. The combustion chamber 302 includes a combustion area 370 within the combustion chamber 302. The combustor 300 includes an inlet 306 and an outlet 308 through which air may pass. The air may be supplied to the combustor 300 by a pre-diffuser 110. Air may also enter the combustion chamber 302 through other holes in the combustor 300 including but not limited to quench holes 310, as seen in FIG. 2A.

Compressor air is supplied from the compressor section 24 into a pre-diffuser strut 112. As will be appreciated by those of skill in the art, the pre-diffuser strut 112 is configured to direct the airflow into the pre-diffuser 110, which then directs the airflow toward the combustor 300. The combustor 300 and the pre-diffuser 110 are separated by a shroud chamber 113 that contains the combustor 300 and includes an inner diameter branch 114 and an outer diameter branch 116. As air enters the shroud chamber 113, a portion of the air may flow into the combustor inlet 306, a portion may flow into the inner diameter branch 114, and a portion may flow into the outer diameter branch 116.

The air from the inner diameter branch 114 and the outer diameter branch 116 may then enter the combustion chamber 302 by means of one or more primary apertures 307 in the combustion liner 600 and one or more secondary apertures 309 in the heat shield panels 400. The primary apertures 307 and secondary apertures 309 may include nozzles, holes, etc. The air may then exit the combustion chamber 302 through the combustor outlet 308. At the same time, fuel may be supplied into the combustion chamber 302 from a fuel injector 320 and a pilot nozzle 322, which may be ignited within the combustion chamber 302. The combustor 300 of the engine combustion section 26 may be housed within a shroud case 124 which may define the shroud chamber 113.

Figure 5A:
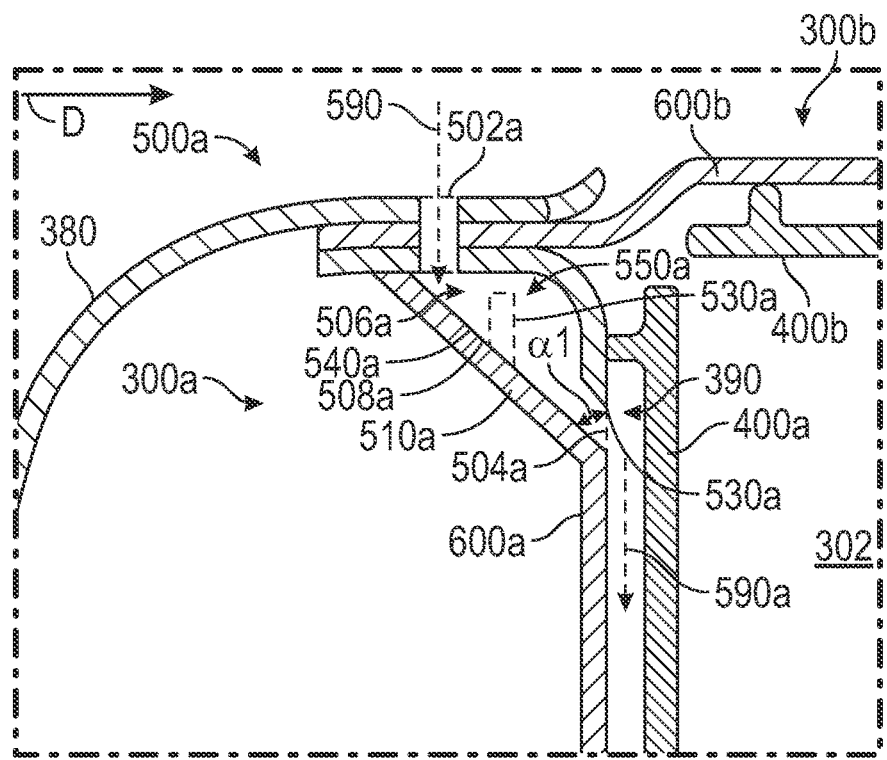
FIG. 5A is an illustration of a configuration of lateral flow injection features including a deflector for a combustor of a gas turbine engine, in accordance with an embodiment of the disclosure.
Figure 5B:
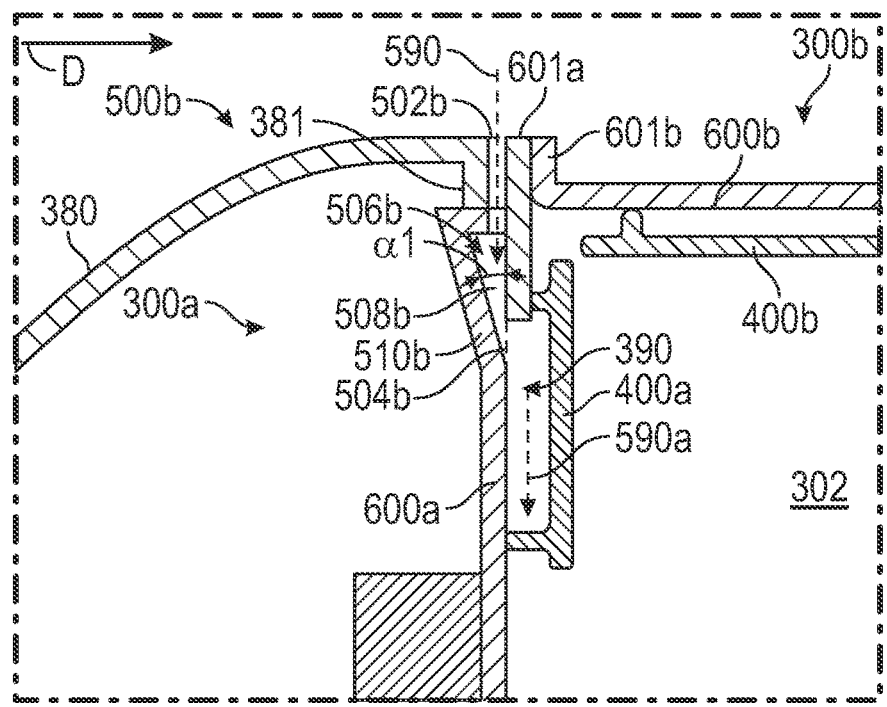
FIG. 5B is an illustration of a configuration of lateral flow injection features including a deflector for a combustor of a gas turbine engine, in accordance with an embodiment of the disclosure.
Figures 1, 5C:
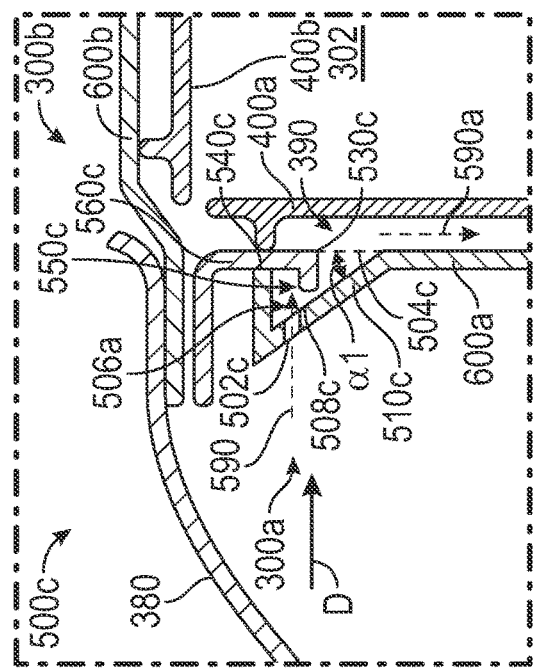
Figures 3, 5C:
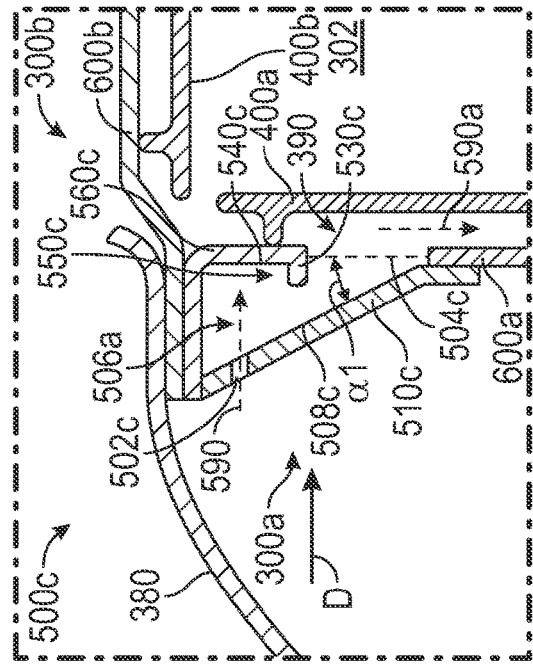
Figures 2, 5C:
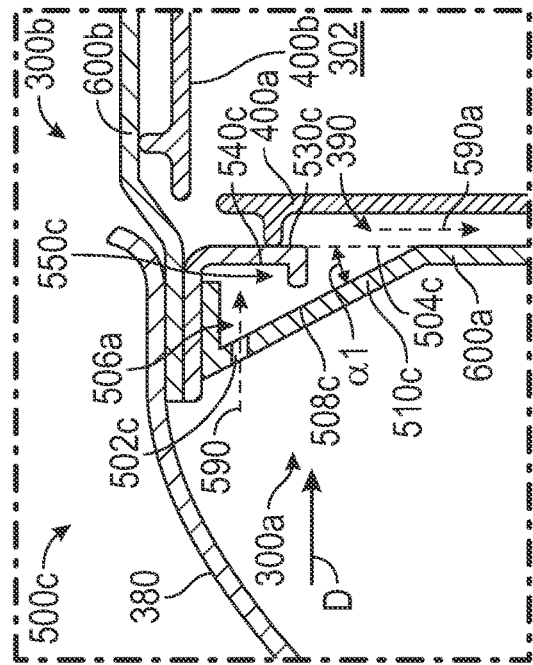

The combustor 300, as shown in FIG. 2, includes multiple heat shield panels 400a, 400b that are attached to the combustion liner 600a, 600b. The heat shield panels 400a, 400b may be arranged parallel to the combustion liner 600a, 600b. The combustion liner 600a, 600b can define circular or annular structures with the heat shield panels 400a, 400b being mounted on a radially inward liner and a radially outward liner, as will be appreciated by those of skill in the art. The heat shield panels 400a, 400b can be removably mounted to the combustion liner 600a, 600b by one or more attachment mechanisms 332. In some embodiments, the attachment mechanism 332 may be integrally formed with a respective heat shield panel 400a, 400b, although other configurations are possible. In some embodiments, the attachment mechanism 332 may be a bolt or other structure that may extend from the respective heat shield panel 400a, 400b through the interior surface to a receiving portion or aperture of the combustion liner 600a, 600b such that the heat shield panel 400a, 400b may be attached to the combustion liner 600a, 600b and held in place. The heat shield panels 400a, 400b partially enclose a combustion area 370 within the combustion chamber 302 of the combustor 300. FIG. 2A shows an enlarged view of the intersection of the bulkhead shell portion 300a of the combustor 300 and the axial shell portion 300b of the combustor 300. The bulkhead shell portion 300a includes heat shield panels 400a and combustion liner 600a. The axial shell portion 300a includes heat shield panels 400b and combustion liner 600b.

Figure 3:
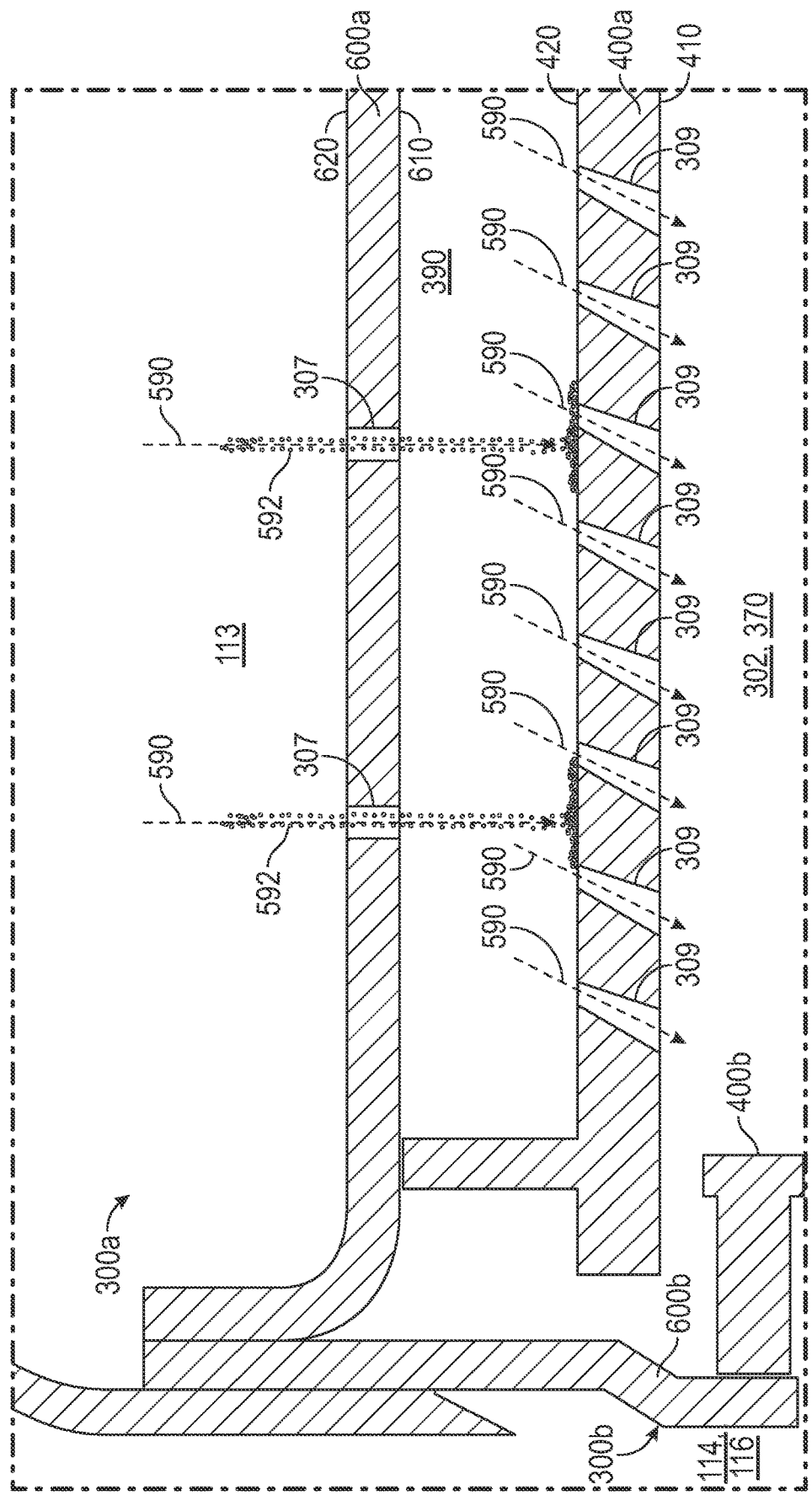
FIG. 3 is an enlarged cross-sectional illustration of a heat shield panel and combustion liner of a combustor, in accordance with an embodiment of the disclosure.

Referring now to FIGS. 3, 4, 5A-C with continued reference to FIGS. 1 and 2. FIG. 3 illustrates a heat shield panel 400a and a combustion liner 600a of a bulkhead shell portion 300a of a combustor 300 (see FIG. 1) of a gas turbine engine 20 (see FIG. 1). The heat shield panel 400 and the combustion liner 600 are in a facing spaced relationship. FIG. 3 also illustrates a heat shield panel 400*b* and a combustion liner 600*b* of an axial shell portion 300*b* of a combustor 300 (see FIG. 1) of a gas turbine engine 20 (see FIG. 1). The heat shield panel 400*a* includes a first surface 410 oriented towards the combustion area 370 of the combustion chamber 302 and a second surface 420 first surface opposite the first surface 410 oriented towards the combustion liner 600*a*. The combustion liner 600*a* has an inner surface 610 and an outer surface 620 opposite the inner surface 610. The inner surface 610 is oriented toward the heat shield panel 400*a*. The outer surface 620 is oriented outward from the combustor 300 proximate the inner diameter branch 114 and the outer diameter branch 116.

The combustion liner 600*a* includes a plurality of primary apertures 307 configured to allow airflow 590 from the inner diameter branch 114 and the outer diameter branch 116 to enter an impingement cavity 390 in between the combustion liner 600*a* and the heat shield panel 400*a*. Each of the primary apertures 307 extend from the outer surface 620 to the inner surface 610 through the combustion liner 600*a*.

Each of the primary apertures 307 fluidly connects the impingement cavity 390 to at least one of the inner diameter branch 114 and the outer diameter branch 116. The heat shield panel 400*a* may include one or more secondary apertures 309 configured to allow airflow 590 from the impingement cavity 390 to the combustion area 370 of the combustion chamber 302.

Each of the secondary apertures 309 extend from the second surface 420 to the first surface 410 through the heat shield panel 400*a*. Airflow 590 flowing into the impingement cavity 390 impinges on the second surface 420 of the heat shield panel 400*a* and absorbs heat from the heat shield panel 400*a* as it impinges on the second surface 420. As seen in FIG. 3, particulate 592 may accompany the airflow 590 flowing into the impingement cavity 390. Particulate 592 may include but is not limited to dirt, smoke, soot, volcanic ash, or similar airborne particulate known to one of skill in the art. As the airflow 590 and particulate 592 impinge upon the second surface 420 of the heat shield panel 400*a*, the particulate 592 may begin to collect on the second surface 420, as seen in FIG. 3. Particulate 592 collecting upon the second surface 420 of the heat shield panel 400*a* reduces the cooling efficiency of airflow 590 impinging upon the second surface 420 and thus may increase local temperatures of the heat shield panel 400*a* and the combustion liner 600*a*. Particulate 592 collection upon the second surface 420 of the heat shield panel 400*a* may potentially create a blockage 593 to the secondary apertures 309 in the heat shield panels 400*a*, thus reducing airflow 590 into the combustion area 370 of the combustion chamber 302. The blockage 593 may be a partial blockage or a full blockage.

Figure 4:
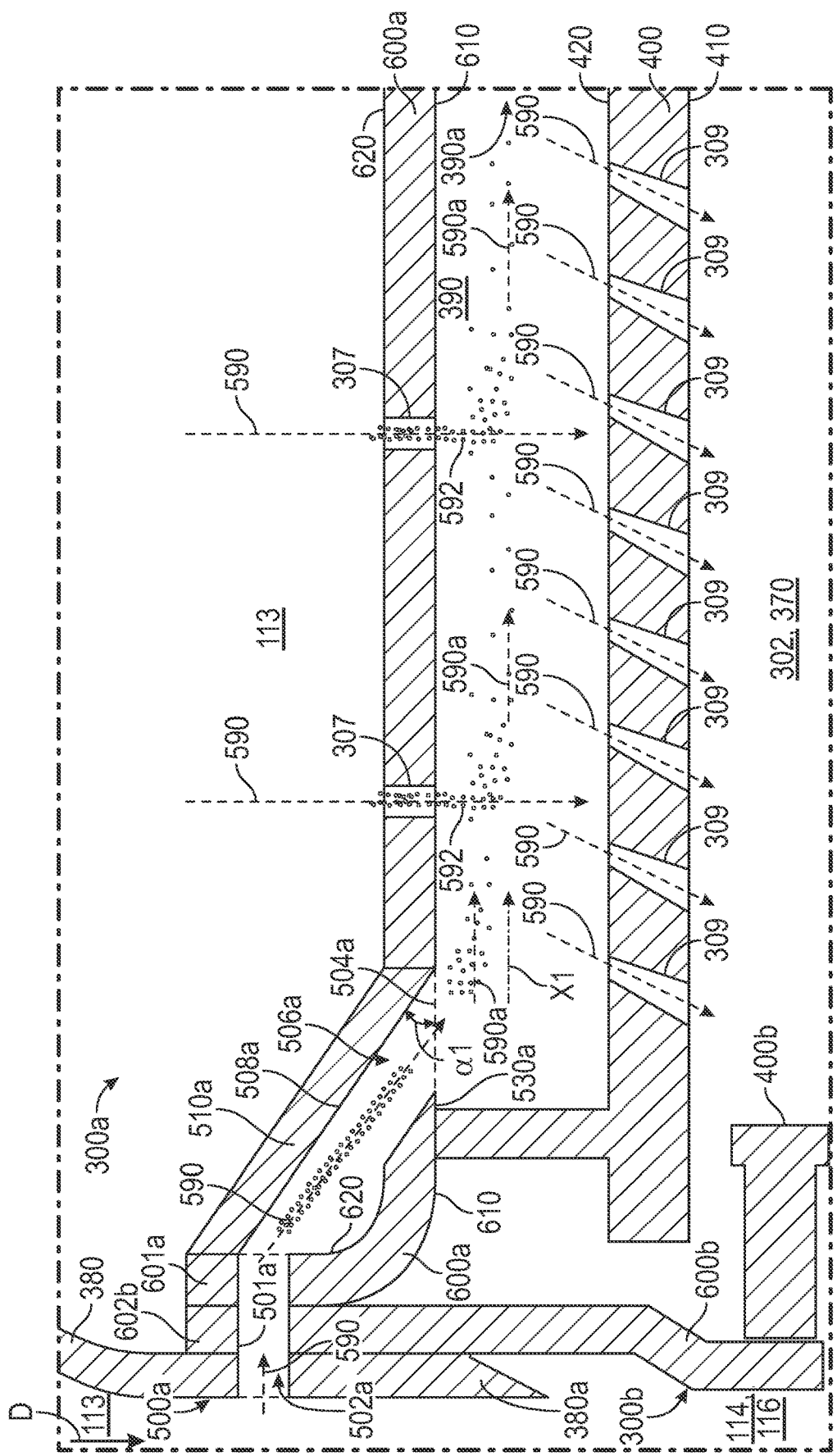
FIG. 4 is an illustration of a configuration of lateral flow injection features including a deflector for a combustor of a gas turbine engine, in accordance with an embodiment of the disclosure.

FIGS. 4 and 5A illustrates lateral injection flow features 500*a-c* that may be added to the intersection of the bulkhead shell portion 300*a* of the combustor 300 and the axial shell portion 300*b* of the combustor 300 to direct airflow from an airflow path D into the impingement cavity 390 in about a lateral direction X1 such that a cross flow 590*a* is generated in the impingement cavity 590. The lateral direction X1 may be parallel relative to the second surface 420 of the heat shield panel 400. Advantageously, the addition of a lateral flow injection features 500*a-c* to the combustion liner 600*a* generates a lateral airflow 590*a* thus promoting the movement of particulate 592 through the impingement cavity 390, thus reducing the amount of particulate 592 collecting on the second surface 420 of the heat shield panel 400*a*, as seen in FIG. 4. Also advantageously, if the impingement cavity 390 includes an exit 390*a*, the addition of a lateral flow injection features 500*a-c* to the combustion liner 600*a* helps to generate and/or adjust a lateral airflow 590*a*, which promotes the movement of particulate 592 through the impingement cavity 390 and towards the exit 390*a* of the impingement cavity 390. The lateral flow injection features 500*a-c* are configured to allow airflow 590 in an airflow path D to enter through an inlet 502*a-c* proximate a combustor cowl 380 (i.e. air flow path D external to the combustor cowl 380 in FIGS. 4, 5A-B, and internal to the combustor cowl 380 in FIGS. 5C-1, 5C-2, and 5*c*-3), convey the airflow 590 through a passageway 506*a-c*, and expel the airflow 590 through an outlet 504*a-c* into the impingement cavity 390 in about a lateral direction. The passageway 506*a-c* fluidly connects the shroud chamber 113 to the impingement cavity 390. The passageway 506*a-c* is fluidly connected to the shroud chamber 113 through the inlet 502*a-c*. The passageway 506*a-c* is fluidly connected to impingement cavity 390 through the outlet 504*a-c*.

In an alternate embodiment, the passageway 506*a* may optionally include an overhang portion 530*a* projecting into the passageway 506*a*. Further, the passageways 506*c* in FIGS. 5C-1, 5C-2, and 5C-3 may also include an overhang portion 530*c*. The overhang portion 530*a*, 530*c* partially divides the passageway 506*a*, 506*c*. The overhang portion 530*a*, 530*c* is configured to create a particulate separation turn 550*a*, 550*c*. The particulate separation turn 550*a*, 550*c* is configured to turn airflow 590 at a selected angle such that the airflow 590 will continue through the passageway 506*a*, 506*c* but momentum of the particulate 592 will carry the particulate 592 into a collection location 530*a*, 530*c*. Advantageously, the separation turn 550*a*, 550*c* may help reduce entry of particulate 592 into the impingement gap 390. The particulate collection location 540*a*, 540*c* may be located opposite the inlet 502*a*, 502*c*. The particulate collection location 540*a*, 540*c* in FIGS. 5A, 5C-1, 5C-2, and 5C-3 is configured as a collection well. The lateral flow injection feature 500*a-c* may be configured differently as shown in FIGS. 5A-C.

FIGS. 4 and 5A illustrate a first configuration of the lateral flow injection features 500*a*. In FIGS. 4 and 5B, the lateral flow injection features 500*a* include an orifice 501*a* and a deflector 510*a*. An end 380*a* of the combustor cowl 380 may be stacked against an end 602*b* of the combustion liner 600*b* of the axial shell portion 300*b* and a flange 601*a* the combustion liner 600*a* of the bulkhead shell portion 300*a*. The orifice 501*a* may pass through the end 380*a* of the combustor cowl 380, the end 602*b* of the combustion liner 600*b* of the axial shell portion 300*b*, and the flange 601*a* of the combustion liner 600*a* of the bulkhead shell portion 300*a*.

The passageway 506*a* of the lateral flow injection feature 500*a* may include a guide wall 508*a* oriented at a selected angle α1 configured to direct airflow 592 in about a lateral direction X1 to generate a cross flow 590*a*. The guide wall 508*a* is a surface of the deflector 510*a* as shown in FIGS. 4 and 5A. The passageway 506*a* is fluidly connected to the inlet 502*a*. The orientation of the inlet 502*a* may be about perpendicular with the airflow path D or perpendicular to the combustor cowl 380, as shown in FIGS. 4 and 5A. Also, as illustrated in FIGS. 4 and 5A, the inlet 502*a* may be circular in shape but it is understood that the inlet 502*a* may be shaped differently.

FIG. 5B illustrates a second configuration of lateral flow injection features 500*b*. The intersection of the bulkhead shell portion 300*a* of the combustor 300 and the axial shell portion 300*b* of the combustor 300 differs in FIG. 5B from FIG. 5A. A flange 381 of the combustor cowl 380 may be stacked against a flange 601b combustion liner 600b of the axial shell portion 300b, and a flange 601a the combustion liner 600a of the bulkhead shell portion 300a. In FIG. 5B, the lateral flow injection features 500b include an orifice 501b and a deflector 510b. The orifice 501b may pass in between the flange 381 of combustor cowl 380 and the flange 601a of the combustion liner 600a of the bulkhead shell portion 300a.

The passageway 506b of the lateral flow injection feature 500b may include a guide wall 508b oriented at a selected angle α1 configured to direct airflow 592 in about a lateral direction X1 to generate a cross flow 590b. The guide wall 508b is a surface of the deflector 510b as shown in FIG. 5B. The passageway 506b is fluidly connected to the inlet 502b. The orientation of the inlet 502b may be about perpendicular with the airflow path D or perpendicular to the combustor cowl 380, as shown in FIG. 5B. Also, as illustrated in FIG. 5B, the inlet 502b may be circular in shape but it is understood that the inlet 502b may be shaped differently.

FIGS. 5C-1, 5C-2, and 5C-3 illustrates a third configuration of lateral flow injection features 500c. In FIG. 5B, the lateral flow injection features 500c include an orifice 501c and a deflector 510c. The orifice 501c may pass through the deflector 510. The passageway 506c of the lateral flow injection feature 500c may include a guide wall 508c oriented at a selected angle α1 configured to direct airflow 592 in about a lateral direction X1 to generate a cross flow 590c. The guide wall 508c is a surface of the deflector 510c as shown in FIGS. 5C-1, 5C-2, and 5C-3. The passageway 506c is fluidly connected to the inlet 502c. The orientation of the inlet 502c may be about parallel with the airflow path D. Also, as illustrated in FIGS. 5C-1, 5C-2, and 5C-3, the inlet 502c may be circular in shape but it is understood that the inlet 502c may be shaped differently.

The third configuration of lateral flow injection features 500c differs between FIGS. 5C-1, 5C-2, and 5C-3 mainly in the connection between the components. The configuration shown in FIGS. 5C-1 and 5C-2 includes a flange 560c and the collection location 540c is located on the flange 560c. The configuration shown in FIG. 5C-3 includes a flange 560c and the collection location 540c is located on the flange 560c and the flange 560c also includes the deflector 510c. The flange in FIG. 5C-3 encloses the passageway 508c.

It is understood that the configurations of lateral flow injection features 500A-C are shown in FIGS. 5A-C for illustrated purposes and are not intended to be limiting thus embodiments shown in each configuration may be mixed and/or combined among the different configurations.

It is understood that a combustor of a gas turbine engine is used for illustrative purposes and the embodiments disclosed herein may be applicable to additional components of other than a combustor of a gas turbine engine, such as, for example, a first component and a second component defining a cooling channel therebetween. The first component may have cooling holes similar to the primary orifices. The cooling holes may direct air through the cooling channel to impinge upon the second component.

Technical effects of embodiments of the present disclosure include incorporating lateral flow injection features into a combustion liner to introduce lateral airflow across a heat shield panel surrounding a combustion area of a combustion chamber to help reduce collection of particulates on the heat shield panel and also help to reduce entry of the particulate into the combustion area.

The term "about" is intended to include the degree of error associated with measurement of the particular quantity based upon the equipment available at the time of filing the application. For example, "about" can include a non-limiting range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A combustor for use in a gas turbine engine, the combustor enclosing a combustion chamber having a combustion area, wherein the combustor comprises:

a combustion liner having an inner surface and an outer surface opposite the inner surface wherein the combustion liner includes a primary aperture extending from the outer surface to the inner surface through the combustion liner;

a heat shield panel interposed between the inner surface of the combustion liner and the combustion area, the heat shield panel having a first surface and a second surface opposite the first surface, wherein the second surface is oriented towards the inner surface, and wherein the heat shield panel is separated from the liner by an impingement cavity;

a deflector forming a passageway with the outer surface of the combustion liner, the passageway configured to direct airflow into the impingement cavity in a lateral direction parallel to the second surface of the heat shield panel such that a cross flow is generated in the impingement cavity, wherein the deflector is located proximate an intersection of a bulkhead shell portion of the combustor and an axial shell portion of the combustor;

a combustor cowl, wherein an end of the combustor cowl is stacked against an end of the combustion liner of the axial shell portion and a flange the combustion liner of the bulkhead shell portion; and an orifice fluidly connected to the passageway, wherein the orifice passes through the end of the combustor cowl, the end of the combustion liner of the axial shell portion, the flange of the combustion liner of the bulkhead shell portion, and then fluidly connects to the passageway of the deflector.

2. The combustor of claim 1, wherein the passageway further comprises:

a guide wall oriented at a selected angle configured to direct the airflow at least partially in the lateral direction parallel to the second surface of the heat shield panel such that the cross flow is generated in the impingement cavity.

3. The combustor of claim 2, further comprising:

an inlet fluidly connecting the passageway to an airflow path located proximate the outer surface of the combustion liner.

4. The combustor of claim 3, wherein:

the inlet passes through the combustion liner.

5. The combustor of claim 4, wherein:

the inlet passes through the combustion liner of an axial shell portion of the combustor.

6. The combustor of claim 3, further comprising:

a particulate collection location located opposite the inlet and proximate a particulate separation turn configured to turn the airflow such that a particulate separates from the airflow and is directed into the particulate collection location.

7. The combustor of claim 3, wherein the inlet passes through the deflector.

8. The combustor of claim 1, wherein:

the combustion liner and the heat shield panel are located in the bulkhead shell portion of the combustor.

9. The combustor of claim 1, wherein the heat shield panel further comprises a secondary aperture extending from the second surface of the heat shield panel to the first surface of the heat shield panel and fluidly connecting the impingement cavity to the combustion area.

10. The combustor of claim 1, further comprising an overhang portion partially dividing the passageway.

\* \* \* \* \*